May 19, 1931.    C. W. McKINLEY    1,806,560
BRACKET
Filed Oct. 20, 1926
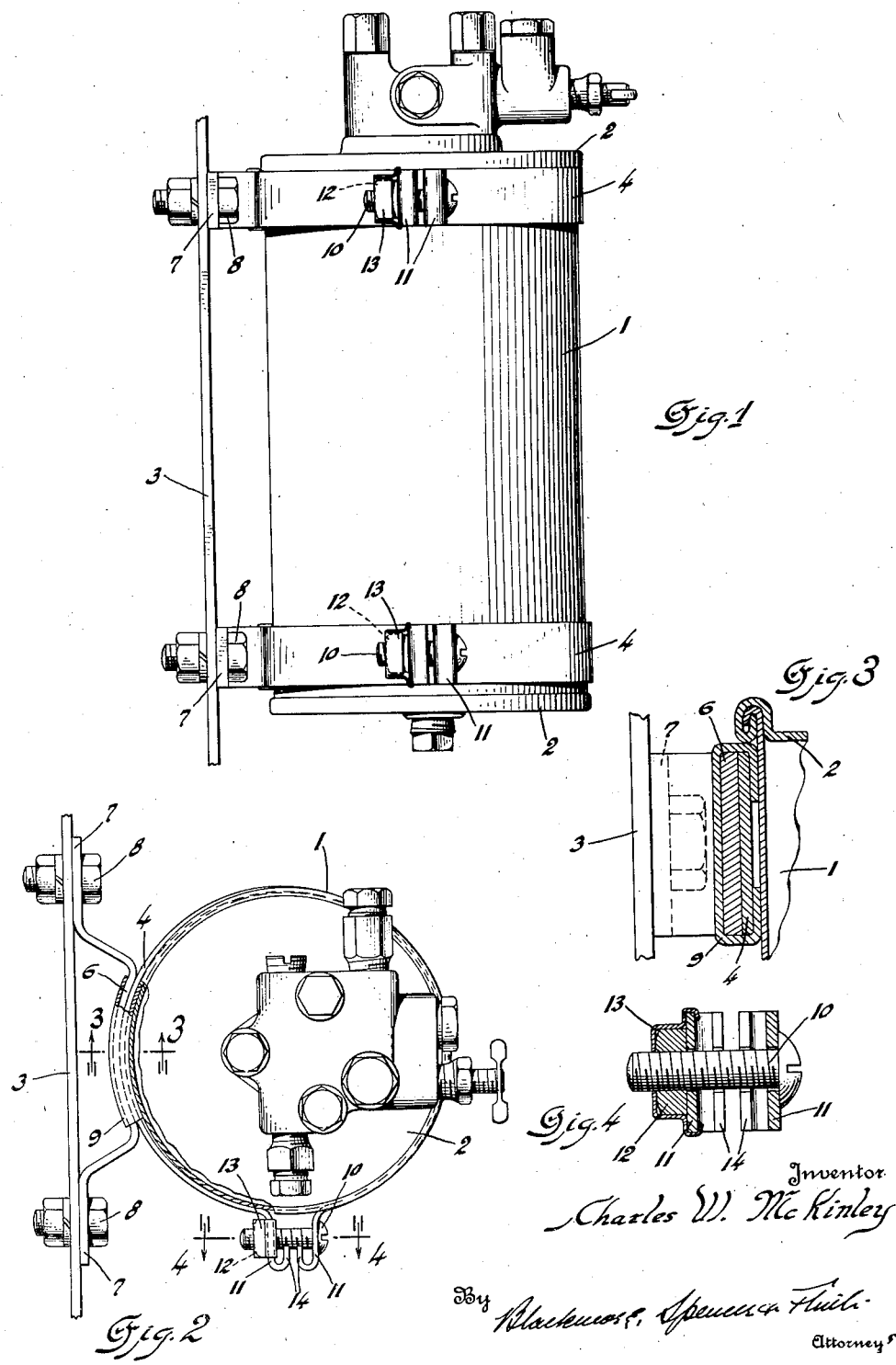

Patented May 19, 1931

1,806,560

UNITED STATES PATENT OFFICE

CHARLES W. McKINLEY, OF FLINT, MICHIGAN, ASSIGNOR TO A C SPARK PLUG COMPANY, OF FLINT, MICHIGAN, A COMPANY OF MICHIGAN

BRACKET

Application filed October 20, 1926. Serial No. 142,975.

This invention relates to supporting brackets and the like, which are to detachably, but firmly secure a body therein.

The primary object of the invention is to provide a bracket of few parts, simple and economical to manufacture, rugged and rigid in construction, and unlikely to get out of repair.

A further object of the invention is to provide a device which will permit the ready removal of replacement of the supported body, and insure the proper location thereof in relation with associated parts.

A further object is to provide a bracket which will serve to reinforce the supported body and resist damage thereto.

Other incidental objects will be apparent from the following specification and the accompanying drawings, where for convenience of disclosure, a practical example of an application of the invention is illustrated, showing a preferred form of the bracket supporting an engine oil filter tank upon the dash of an automobile.

Referring to the drawings, Figure 1 is an elevation of an oil filter tank suspended from an automobile dash board by the present bracket. Figure 2 is a top plan view of the construction shown in Figure 1, partly broken away. Figure 3 is a section on line 3—3 of Figure 2; Figure 4 is a section on line 4—4 of Figure 2.

As will be understood, the invention is usable in connection with other types of receptacles or containers, but being particularly adaptable for use with oil filter tanks of the cylindrical type, indicated by reference character 1, will be so described. Such oil filters are provided at their top, with inlet and outlet connections with conduits leading to and from other parts of the lubricating system. The top and bottom of the cylindrical receptacle 1, are provided with closure lids 2, the joints being soldered or flanged over and interlocked in the manner illustrated in Figure 3. The filter tank is secured to the automobile dash 3, preferably by a pair of brackets, located respectively at the top and bottom ends. Each bracket consists of a circular contractible clamp band or ring 4, surrounding the filter tank 1, and a supporting member comprising a concave arcuate portion 6 agreeing with the contour of the clamp band 4, and rearwardly offset feet 7 adapted to be fastened as by bolts 8, to the dash 3. A sleeve 9, surrounding the portion 6 and adjacent section of the band 4, forms a secure attachment connection for the parts. The screw bolt 10, passing thru lateral ears 11—11 of the band 4, controls the contraction of the band upon the container 1, by its threaded engagement with a nut 12. To hold the nut and bolt in adjusted relation, a sheet metal stamped cup 13 fits over the nut and has its ends inturned about the adjacent ear 11. The ends of the ears 11 may be reversely curved or bent back as at 14, to rest against the body of the bolt and support the ears. By referring to Figures 2 and 4, it will be noted that the return bent ends 14 of the ears 11 have grooves in which the bolt 10 is received.

The brackets are preferably positioned adjacent the top and bottom ends of the container. By locating the upper bracket so that the overhanging ledge of the container rests against the bracket, replacements may be easily made without necessity for adjusting the location of the container in relation to the associated parts of the filter system. Furthermore, the band serves to reinforce and prevent separation of the joint between the side and ends, while the ends resist any tendency to contract the bands too tightly, and relieves the cylindrical wall of clamping strain.

Having described the invention, I claim:

1. A supporting bracket including a contractive band adapted to encircle and removably clamp a circular receptacle, a supporting member therefor having a concave arcuate portion in which the band is seated, and an attachment sleeve surrounding the band and arcuate portion against which the receptacle is seated upon contraction of the band.

2. In a support for a container, a rounded holding member for the container, a substantially U-shaped attaching member at said holding member and conforming thereto along its surface of contact therewith, said attaching member having its contacting surface forming the base of the U, a sleeve surrounding both of said members at their contacting surfaces, and feet or bent portions on the arms of the U of said attaching member to secure it to a support.

In testimony whereof I affix my signature.
CHARLES W. McKINLEY.